United States Patent [19]

Smith

[11] Patent Number: 5,016,950

[45] Date of Patent: May 21, 1991

[54] FULL-COLOR ZERO-ORDER SUPPRESSED DIFFRACTION OPTICS DIFFUSING SCREEN/LOUVER FILTER LAMINATE

[75] Inventor: Ronald T. Smith, Redondo Beach, Calif.

[73] Assignee: Hughes Aircraft Company, Los Angeles, Calif.

[21] Appl. No.: 215,474

[22] Filed: Jul. 5, 1988

[51] Int. Cl.$^5$ ............................................. G02B 5/32
[52] U.S. Cl. .................................... 350/3.7; 350/3.72
[58] Field of Search ...................... 350/3.7, 3.85, 3.86, 350/174, 3.72, 3.83, 3.84, 3.6

[56] References Cited

U.S. PATENT DOCUMENTS

| | | | |
|---|---|---|---|
| 3,944,322 | 3/1976 | Benton | 350/3.85 |
| 4,179,182 | 12/1979 | Smith | 350/3.6 |
| 4,337,992 | 7/1982 | Johnson | 350/3.79 |
| 4,372,639 | 2/1983 | Johnson | 350/3.7 |
| 4,582,389 | 4/1986 | Wood et al. | 350/3.69 |
| 4,586,781 | 5/1986 | Gunther et al. | 350/3.7 |
| 4,623,215 | 11/1986 | Bazargan | 350/3.85 |
| 4,799,765 | 1/1989 | Ferrer | 350/174 |

Primary Examiner—Paul M. Dzierzynski
Assistant Examiner—R. D. Shafer
Attorney, Agent, or Firm—Leonard A. Alkov; Wanda K. Denson-Low

[57] ABSTRACT

A full-color holographic screen laminate is disclosed, having a well-defined exit pupil, off-axis viewing capabilities, high and uniform gain, and low backscatter, and in addition the capabilities of blocking the zero-order beam and allowing full-color viewing. The laminate in one preferred form includes several layers, including a plano-convex focusing lens, a directional diffraction optics diffusing screen, and a thin plane-parallel laminate consisting of a plano-concave cylindrical lens, a slanted louver filter, and a plano-convex cylindrical lens. The lenses can be made out of contrast enhancement material. The louver filter is curved so that the louvers are oriented parallel to the line of sight across the entire louver surface. The plano-convex lens focuses the light, the diffusion screen bends and diffuses the light, the louver filter passes the diffracted light but blocks the zero-order light from entering the ambient, and the contrast enhancement lens increases the overall contrast of the screen.

4 Claims, 7 Drawing Sheets

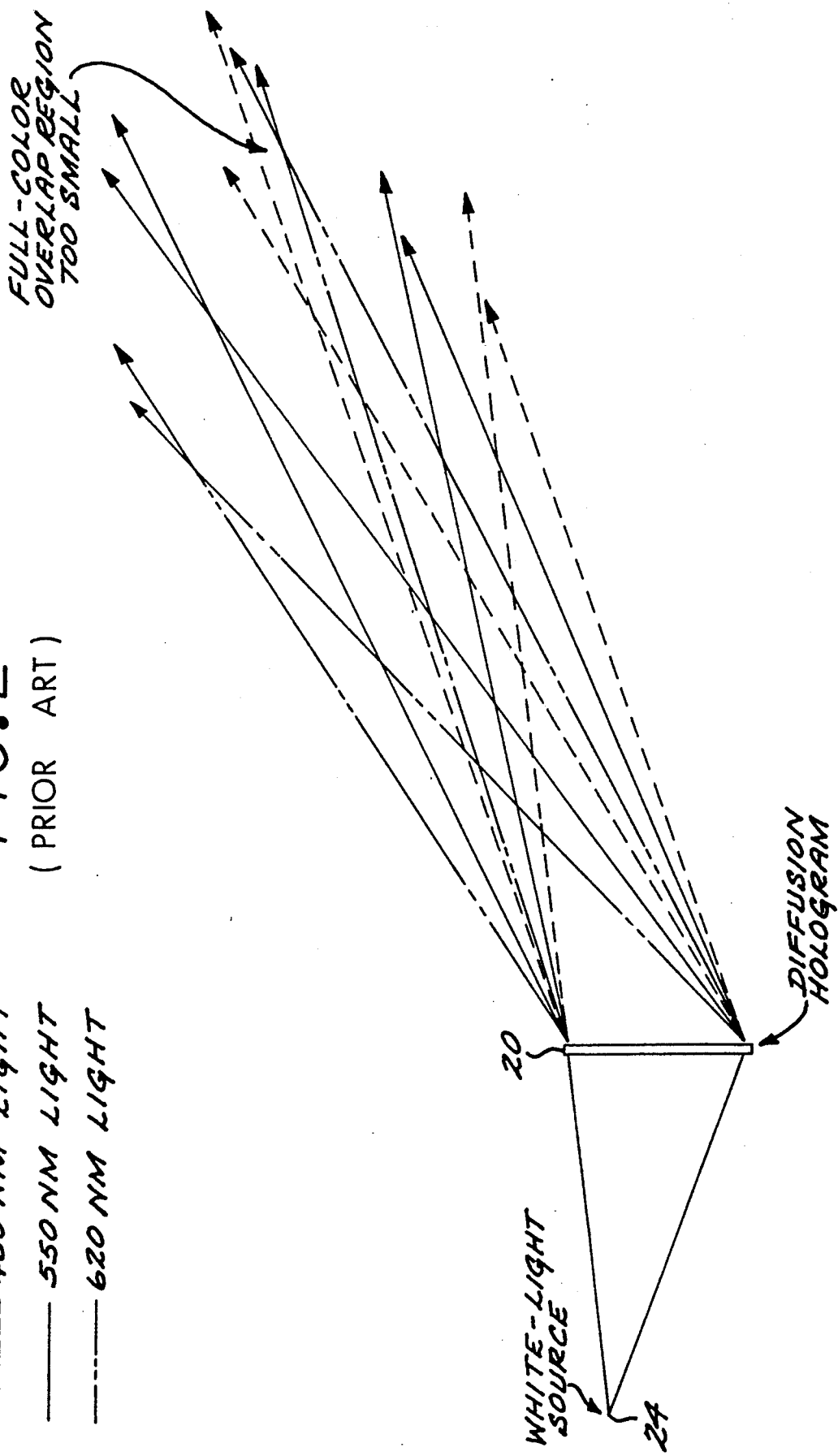

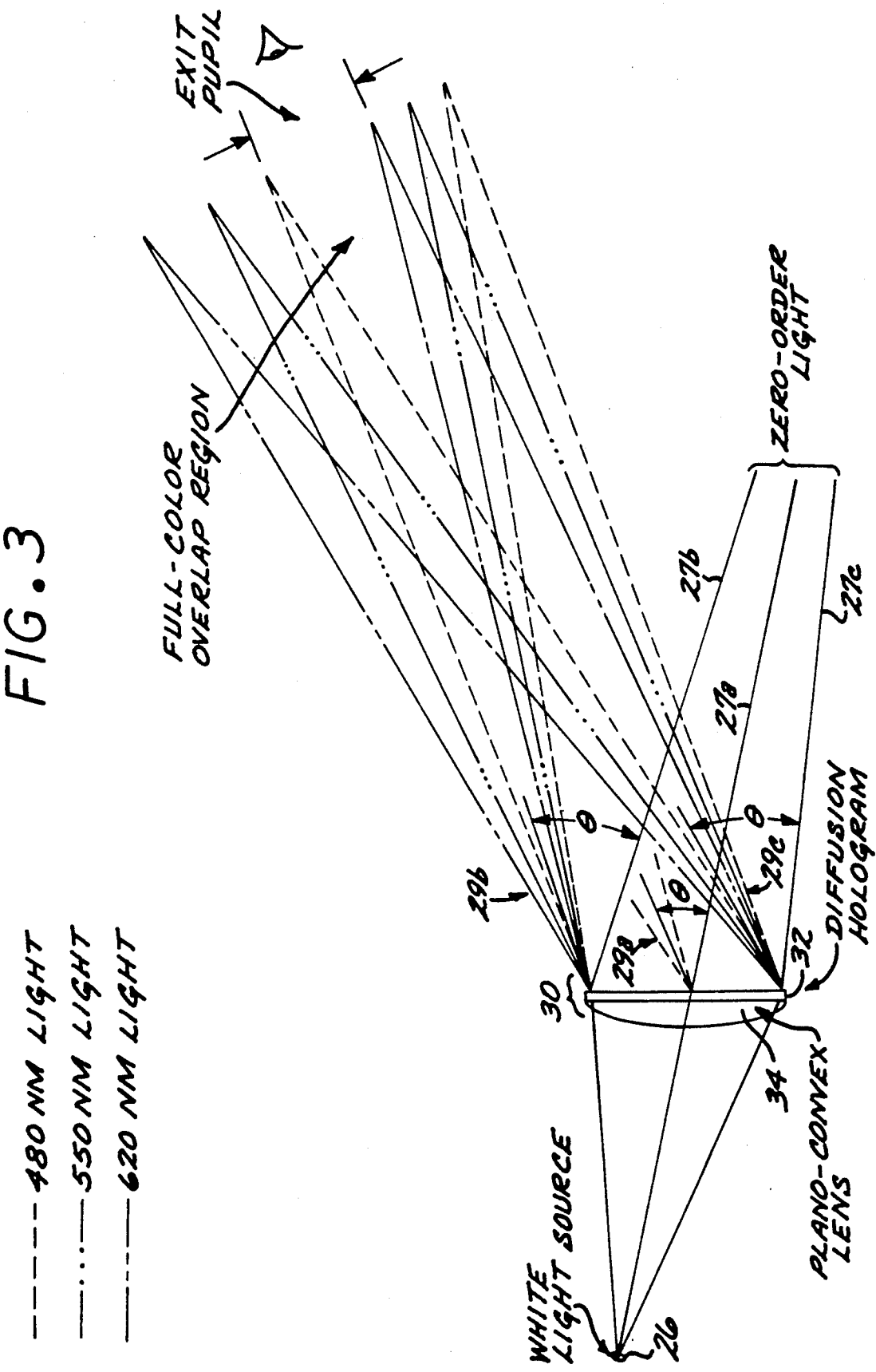

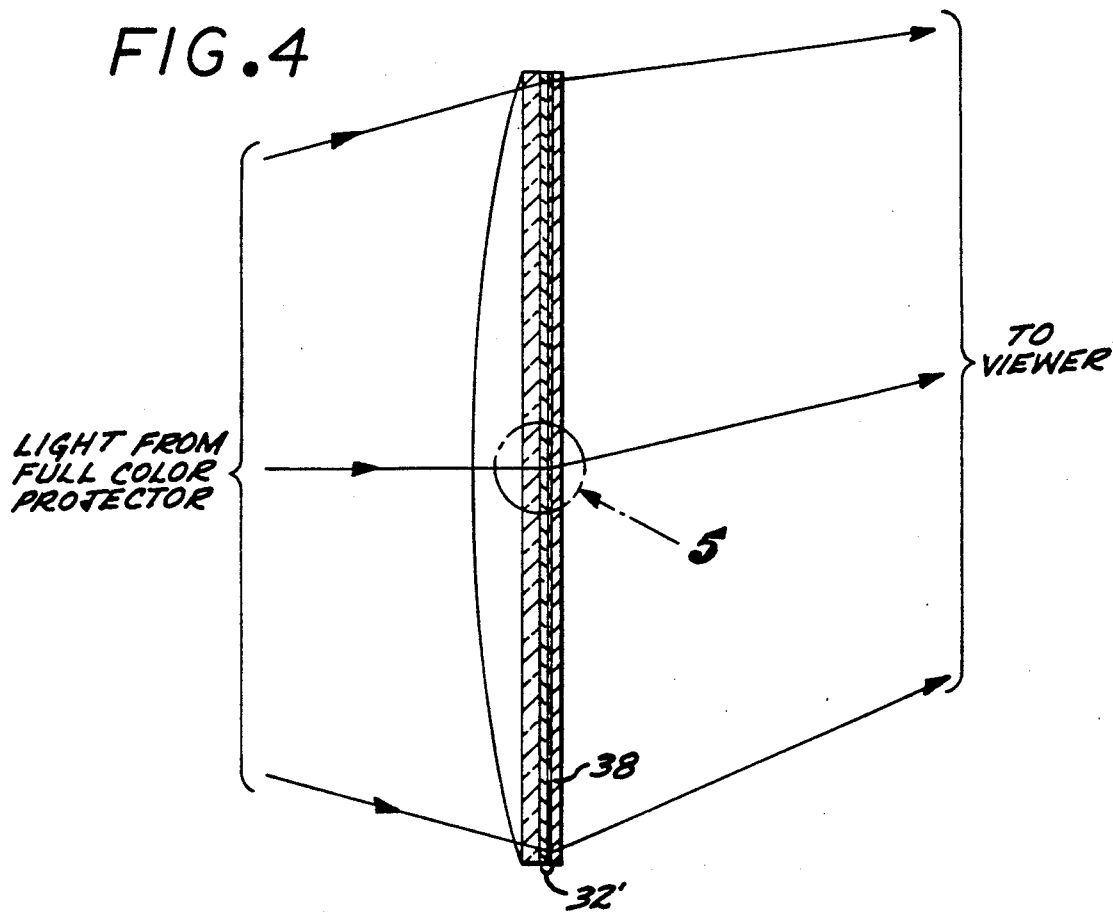
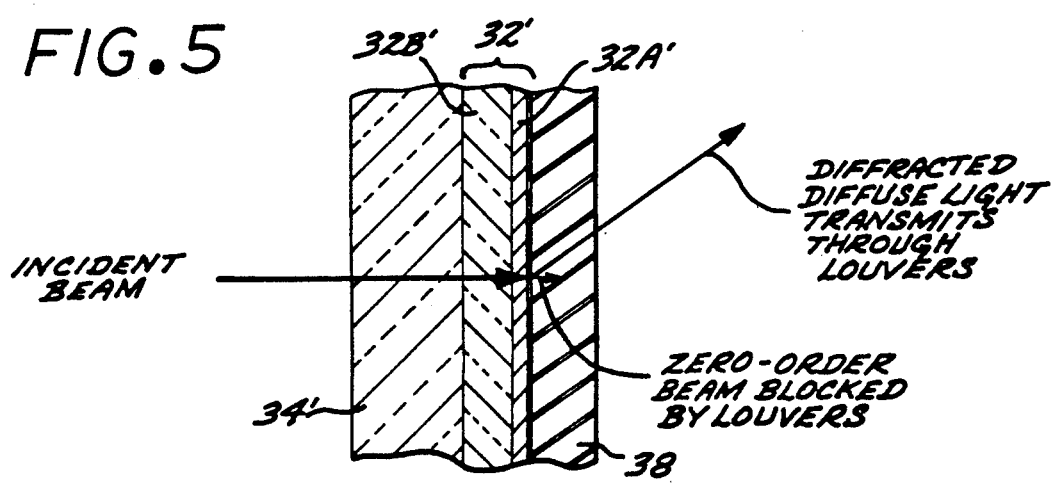

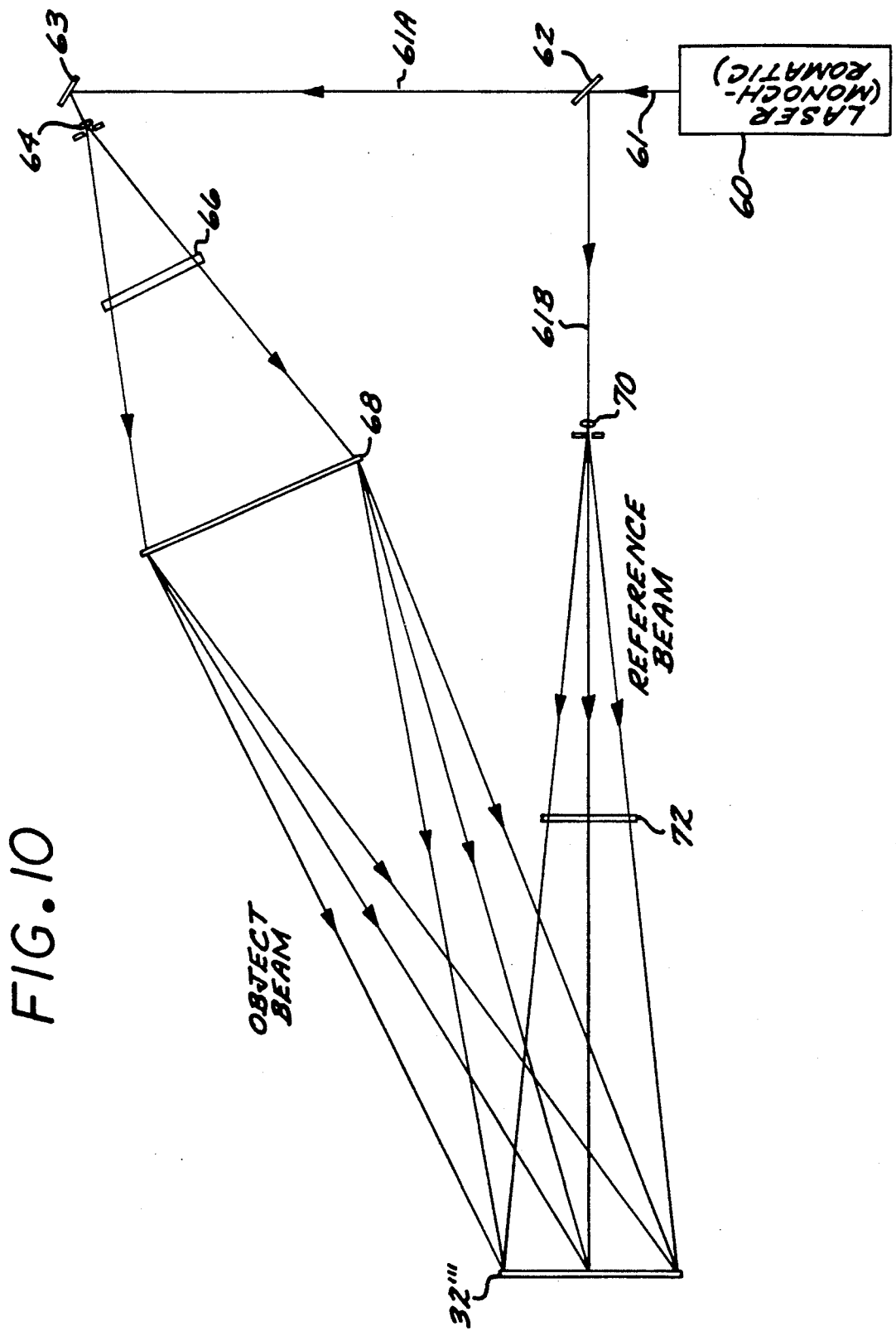

FULL-COLOR ZERO-ORDER SUPPRESSED DIFFRACTION OPTICS DIFFUSING SCREEN/LOUVER FILTER LAMINATE

BACKGROUND OF THE INVENTION

The present invention relates to diffraction optics screen apparatus, and more particularly to such apparatus which provides the capabilities of full-color viewing and suppression of zero-order light.

Diffraction optics diffusion screens employing holographic elements are well known in the art. U.S. Pat. No. 4,372,639 discloses a diffraction optics directional diffusing screen. FIG. 1 illustrates a simple diffraction optics diffusion screen 20 of the type more particularly described in U.S. Pat. No. 4,372,639, illuminated by light from a monochromatic light source 22. This type of screen employs a diffusion hologram, and exhibits a small and well-defined exit pupil, high and uniform gain across the exit pupil, and low backscatter. However, the light which passes through the holographic optical element 20 without diffraction, known as zero-order light, passes into the ambient, which is undesirable. Further, the simple diffusion hologram of FIG. 1 does not play back well in full-color. The white light incident on the hologram would be dispersed, i.e., diffracted at different angles for different wavelengths, creating a rainbow-like fan of colored light exiting each point on the hologram. This effect is illustrated in FIG. 2, wherein the screen 20 is illuminated by light from a white light source 24. Because the divergence of the projected beam onto the screen creates a wide variation in the incident angle, the resultant dispersion is so great that only a small overlap region between the red, green, and blue exit pupils is available for full-color viewing.

The problem of the zero-order light can be addressed by the addition of a fiber optic faceplate, as shown in U.S. Pat. No. 4,586,781. The faceplate absorbs the zero-order light while transmitting the diffracted light, and scrambles the multicolored diffuse cones of light about its fiber axis to create a uniform full-color exit cone. The problem with this configuration is that the optical fibers of a fiber optic faceplate are all oriented parallel to each other, so that the exiting diffuse cones are all parallel to one another. To obtain any appreciable overlapped full-color viewing region requires making the diffuse cones very large. The result is that much of the light is wasted and the main advantage of the holographic screen, its high gain, is severely compromised. One could use a lens on the front of the screen to achieve the focusing of the diffuse cones so as to preserve the high screen gain. However, a convex surface facing outward in a high ambient level environment is unacceptable, because it will reflect ambient light or sunlight from a wide range of positions directly into the viewer's exit pupil.

It is therefore an object of this invention to provide a screen possessing the advantages of the directional diffraction optics diffusing screen, and in addition be able to block the zero-order beam and allow full-color viewing.

SUMMARY OF THE INVENTION

An optical apparatus is disclosed for efficient full-color viewing of a projected image. In one form, the apparatus comprises a diffraction optics holographic diffusion screen for diffracting the incident image light toward a well-defined image pupil. To block the zero-order light passed through the diffusion screen, a louver filter is combined with the diffraction optics holographic diffusion screen. The louver filter comprises a plurality of transparent cells separated by opaque louvers or partitions. A plano-convex lens may be disposed in front of the diffusion screen to focus the light from a full-color point source projector. This provides an efficient screen assembly which diffracts white light from a point source projector so that the red, green and blue exit pupils substantially overlap, creating a large overlap region for full-color viewing.

In another form, the optical apparatus includes the plano-convex focusing lens, the diffraction optics holographic diffusion screen and the louver filter, with the louver filter curved in a shallow semicylindrical form so that each louver is aligned with the viewer's line of sight. This curvature substantially eliminates image vignetting and moire patterns. Means are provided for mounting the louver filter to achieve the desired curvature. This means comprises laminating the louver filter between a cylindrical plano-concave lens and a cylindrical plano-convex lens, which can provide in addition a contrast enhancement filter.

BRIEF DESCRIPTION OF THE DRAWINGS

These and other features and advantages of the present invention will become more apparent from the following detailed description of exemplary embodiments thereof, as illustrated in the accompanying drawings, in which:

FIGS. 1 and 2 illustrate a known diffraction optics directional diffusing screen being illuminated by respective monochromatic and white light sources.

FIG. 3 illustrates one aspect of the invention, employing a focusing lens in front of the directional diffusing screen to provide a large area for full-color viewing.

FIG. 4 illustrates a preferred embodiment of the invention employing a focusing lens, a diffusion screen and a louver filter.

FIG. 5 is an enlarged view of a cross-section of the screen laminate of FIG. 4 taken within the area indicated by circle "5" in FIG. 4.

FIG. 10 illustrates an exposure setup for fabricating the diffraction optics holographic screen employed in the disclosed embodiments of the invention.

DETAILED DESCRIPTION OF THE INVENTION

Figure 1:
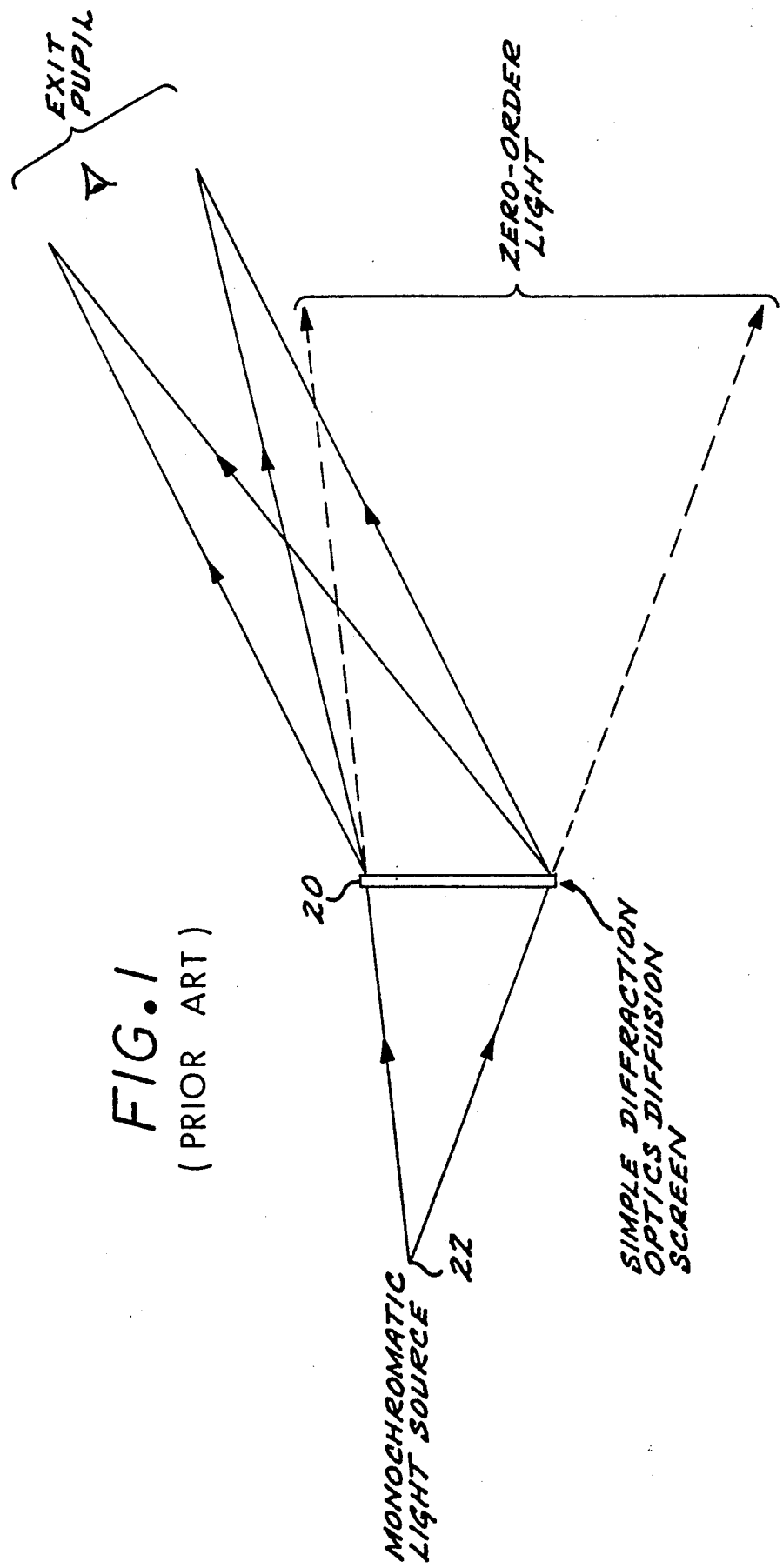

One aspect of the invention is shown in FIG. 3. The screen laminate 30 comprises a plano-convex lens 34 disposed in front of the diffusion hologram 32 to do most or all of the focusing of the light from the point source projector 26, leaving the hologram 32 only to do the bending and diffusing. The result is a screen laminate 30 which is able to diffract white light from the point source projector 26 so that the red, green, and blue exit pupils substantially overlap, creating a large overlap region for full-color viewing. The optimum overlap, and therefore the highest screen gains, can be achieved when the lens 34 is designed to do all the focusing of the light incident from the projector 26, so that the bend angle $\theta$ is constant across the entire hologram 32.

The bend angle $\theta$ is the angle between each focused ray leaving the lens 34, i.e., as if the diffusion hologram 32 were not present, and the central ray of the corresponding diffracted cone of light leaving the diffusion hologram 32. Thus, for example, the angle 8 extends between the center axis of light cone 29a and the focused ray 27a, between the center axis of light cone 29b and the focused ray 27b, and also between the center axis of light cone 29c and the focused ray 27c (FIG. 3). It is to be understood that the focused rays 27a–c are shown for illustrative purposes, representing the focusing of the incident light from the source 26 by the lens 34. The light which is diffracted by the hologram 32 will be diffracted toward the exit pupil as indicated in FIG. 3; only the undiffracted, zero-order light will follow rays 27a–27c.

The bend angle $\theta$ and gelatin thickness of the diffusion hologram 32 can be designed so that the spectral bandwidth of the screen is very wide, so the screen efficiently diffracts light across the entire visible spectrum. A decrease in bend angle and gelatin thickness cause an increase in spectral bandwidth, as is known to those skilled in the art.

The screen laminate illustrated in FIG. 3 is capable of efficient full color viewing, but does not block the zero-order light passed through the diffusion hologram 32. A preferred embodiment of the invention shown in FIGS. 4 and 5 blocks the zero-order light by laminating the lens/hologram assembly of FIG. 3, i.e., plano-convex lens 34' and diffusion hologram 32', with a slanted louver filter 38 that will allow the diffracted diffuse light to transmit through the filter 38 while blocking the zero-order light. The diffusion hologram 32' comprises a gelatin layer 32' on a substrate 32B'.

The louver filter 38 is a "Venetian blind" type of device consisting of transparent cells separated by opaque louvers or partitions. One example of a louver filter is the Light Control Film commercially available from the 3M Company. The Light Control Film is a thin flexible plastic film containing closely spaced black microlouvers. The thin film substrate is cellulose acetate butyrate. The product is available with several possible louver orientations, wherein maximum light transmission is, variously, at 0° (normal to the film surface), 18°, 30°, or 45° (all angles in air). The product is available in film thicknesses from 0.030 to 0.050 inches, lower spacing of 0.005 or 0.010 inches, and a lower thickness of 0.0005 inches. Using a Light Control Film with a film thickness of 0.030 inches, maximum light transmission angle of 30°, louver spacing of 0.005 inches, and a louver thickness of 0.0005 inches has been found to work well for the present application.

The filter 38 is bonded to the gelatin layer 32A' of the diffraction optics diffusion screen 32' (FIGS. 4 and 5). With the Light Control Film marketed by 3M used as the filter 38, the 3M polymerizing adhesive PA-4824 is preferably used to bond the filter to the diffusion screen 32'. The use of this adhesive and its properties is disclosed in the data sheet issued by the Adhesives, Coatings and Sealers Division of 3M on Oct. 6, 1976.

Figure 6:
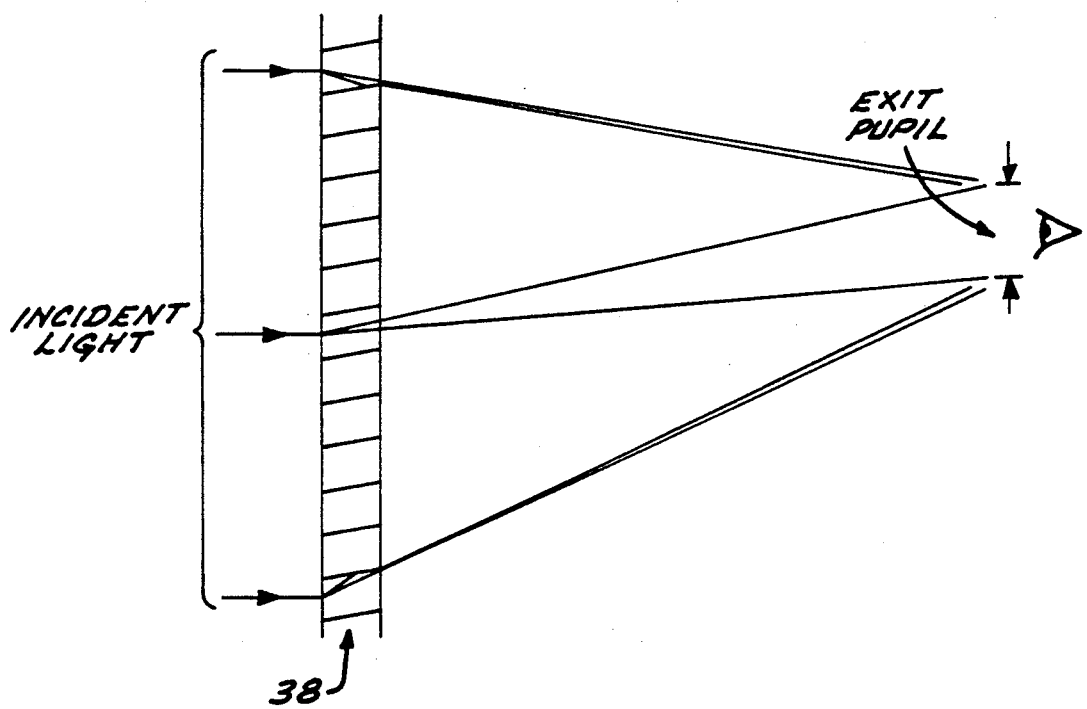
FIG. 6 illustrates the vignetting of the image through a louver filter which is planar.

In the embodiment shown in FIGS. 4 and 5, the louvers comprising the filter 38 are optimally oriented toward the viewer at only one strip along the center of the hologram 32A', as illustrated in FIG. 6. Moving above and below the hologram center, the louvers increasingly vignette the diffracted diffuse light. The result is an objectionable rolloff in screen intensity toward the top and bottom of the hologram 32A'. Furthermore, if the louver spacing of the louver filter 38 is greater than the display pixel size, then whole rows of pixels will be occluded near the top and bottom of the screen. If the louver spacing in on the order of the pixel spacing, objectionable moire patterns will result.

Figure 7:
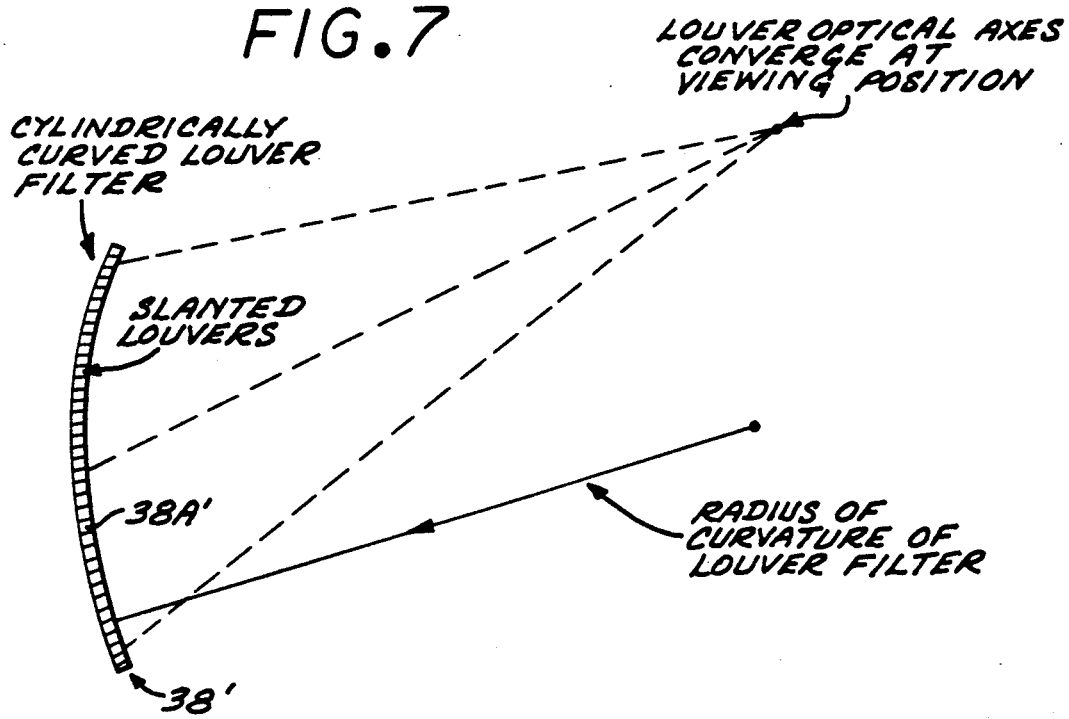
FIG. 7 illustrates a cylindrically curved louver filter for eliminating the image vignetting illustrated in FIG. 6.

All the foregoing problems are alleviated by bending the louver filter into a shallow semi-cylinder so that every louver in the filter is lined up optimally with the viewer's line of sight at the exit pupil. This is illustrated in FIG. 7, with the filter 38' bent so that the louvers 38A' are lined up with the viewer's line of sight. A practical way of implementing the bending of the filter is to embed the curved louver filter between a cylindrical plano-concave lens and a cylindrical plano-convex lens, each with the desired curvature. These lenses could be made out of clear material; however, it is likely that, for many applications, one would want to make the lenses absorptive. Since the ambient light must pass through the absorptive lens twice to return to ambient, while the image light passes through the absorptive lens only once, the result is an improvement of display contrast at the expense of some display brightness. Thus, the absorptive filter comprising the plano-convex and plano-convex lenses can comprise a contrast enhancement filter.

Figure 8:
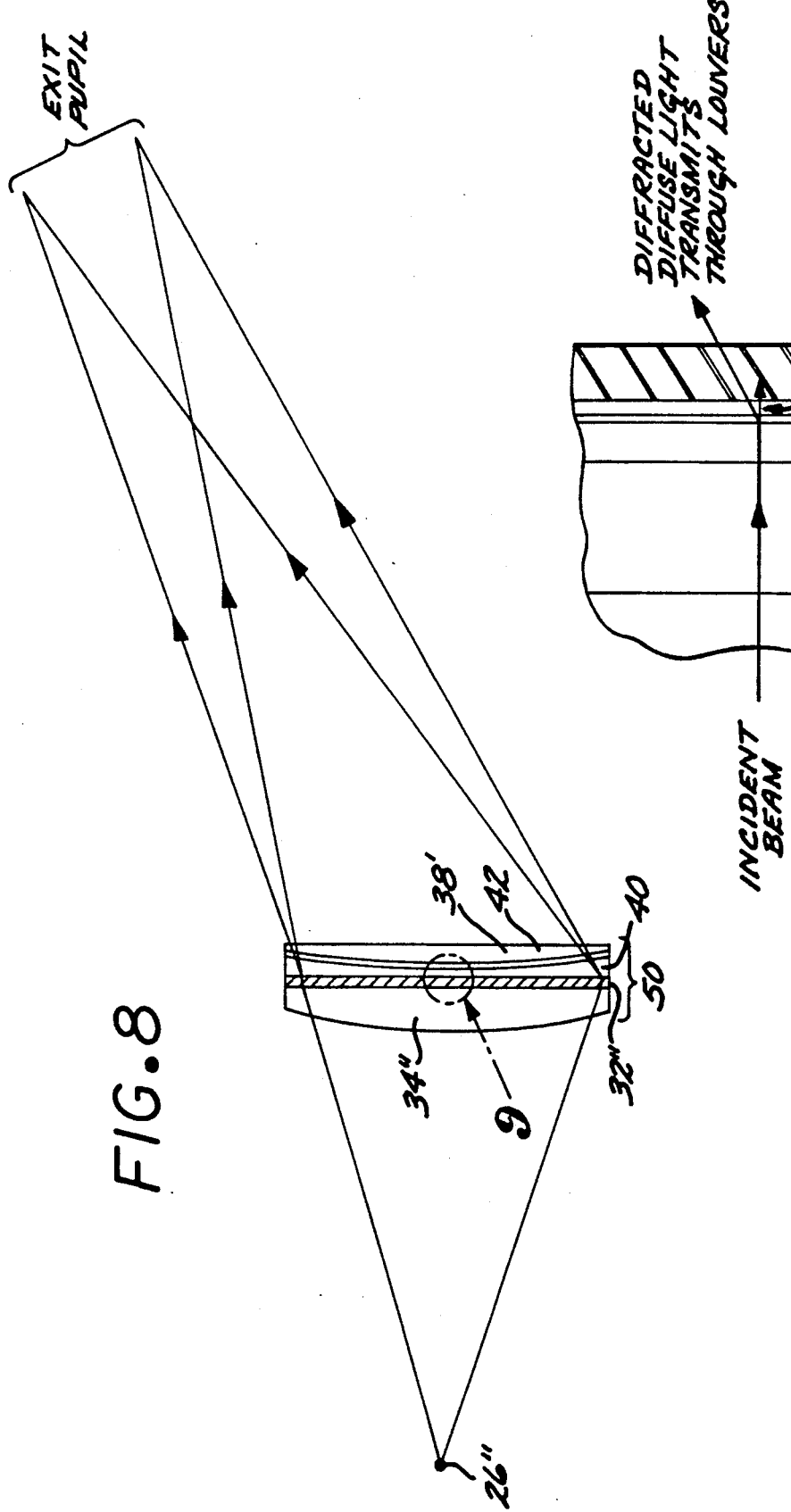
FIG. 8 illustrates another preferred embodiment of the invention.
Figure 9:
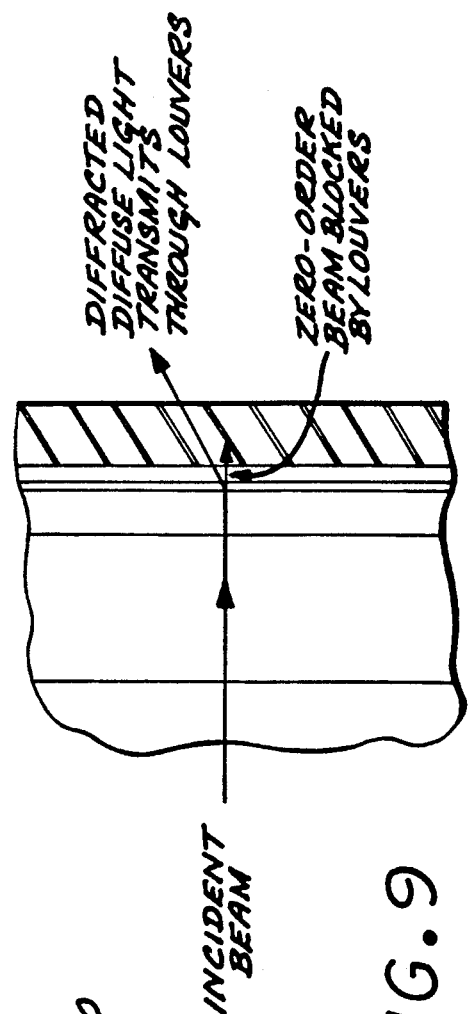
FIG. 9 is an enlarged cross-sectional view of the screen laminate of FIG. 8 taken within the area indicated by "9" in FIG. 8.

The overall result is the optical apparatus shown in FIGS. 8 and 9. The screen module 50 possesses all the advantages of a simple diffraction optics diffusion screen plus allows zero-order suppression of light and full-color viewing. The module 50 comprises a plano-convex lens 34" for focusing the light from the white light point projector 26", the diffraction optics diffusion screen 32" for diffracting incident white light toward overlapping red, green and blue exit pupils, and the assembly comprising the plano-concave lens 40, the curved louver filter 38' and the plano-convex lens 42. The curvatures of the respective concave and convex surfaces of the lens 40 and 42 are selected to conform the louver filter 38' to the appropriate semi-cylindrical contour needed to align each louver with the viewer's line of sight. The radius of curvature R is shown in FIG. 7, with the center of the cylinder disposed on axis with the filter 38', and vertically aligned with the viewing position where the louver optical axes converge. The composite focusing effect of the complementary lens 40 and 42 is neutral. There will be some absorption, and to utilize the contrast enhancement properties of the assembly, the lens 38 and 40 may be fabricated from a material such as BG20 optical glass.

In order to bond the louver filter to the lens 38 and 40, in the application wherein the 3M Light Control Film is employed as the louver filter, and the lens 40 and 42 are fabricated from glass, the 3M polymerizing adhesive PA-4824 is preferably employed.

The diffusion hologram comprising each of the embodiments described above can be fabricated using the simple exposure setup shown in FIG. 10. The exposure setup comprises a monochromatic laser 60, typically an argon laser generating 514.5 nanometer wavelength light. The laser light beam 61 is directed to beam splitter 62, which splits beam 61 into two beams 61A and 61B. The beam 61A is used to produce the object beam, and is reflected from mirror 63 through a spatial filter 64 and a gaussian apodizer 66 to a Lambertian or silver halide holographic diffuser 68. The resulting beam exiting the diffuser 68 is the object beam which is incident on the holographic film comprising screen 32'''.

The exposure reference beam is formed from beam 61B, after being passed through spatial filter 70 and gaussian apodizer 72.

The object beam light reflected from the diffusion screen interferes with the spherical reference beam wave to create a standing wave pattern which is recorded in the hologram plate 32'''. During playback, the reverse of the reference wave, namely, a converging beam, is incident on the hologram 32''', which diffracts the light and focuses it into the well-defined pupil. The general exposure process is well known in the art, as described, for example, in U.S. Pat. No. 4,372,639, at column 4, line 12, through column 5, line 5.

It is understood that the above-described embodiments are merely illustrative of the possible specific embodiments which may represent principles of the present invention. Other arrangements may readily be devised in accordance with these principles by those skilled in the art without departing from the scope of the invention. For example, it is not necessary to employ the plano-convex lens in front of the diffusion screen, although for a point source projector it does contribute to more efficient operation.

What is claimed is:

1. An optical apparatus, comprising:
   a first plano-convex lens for focusing light incident thereon;
   a holographic optical element positioned adjacent to said plano-convex lens to receive said focused light and comprising means for diffracting a beam of white light incident upon any particular point on said holographic optical element from a predetermined direction toward substantially overlapping red, green and blue exit pupils;
   a louver filter positioned with respect to said holographic element so that light passing through said element impinges on said filter, the diffracted light being transmitted through said filter and the undiffracted light being blocked by said filter, said filter comprising a thin flexible translucent substrate and a plurality of opaque louvers which are aligned parallel to each other when the substrate is planer; and
   a plano-concave lens and a second plano-convex lens, said louver filter being laminated between said respective lens, the curvature of the respective concave and convex surfaces of said lens being selected so that each of the louvers comprising said louver filter are aligned with a viewer's line of sight at the exit pupil.

2. The optical apparatus of claim 1 further comprising a full color image projector for generating full color image light substantially from a point source, and wherein said first plano-convex lens comprises means for focusing image light from said projector.

3. An optical apparatus comprising:
   a diffusion holographic optical element comprising means for diffracting a beam of white light incident upon any particular point on said holographic optical element from a predetermined direction toward substantially overlapping red, green and blue exit pupils;
   a louver filter positioned with respect to said holographic element so that light passing through said element impinges on said filter, the diffracted light being transmitted through said filter and the undiffracted light being blocked by said louver filter, said filter comprising a plurality of transparent cells separated by opaque louvers; and
   means for positioning said louver filter so that said louvers are each respectively aligned with a viewer's line of sight, said means for positioning comprising a plano-concave lens disposed on a first side of said filter and a plano-convex lens disposed on a second side of said filter for laminating said filter therebetween.

4. The optical apparatus of claim 3 wherein said plano-concave lens and said plano-convex lens are fabricated from an absorptive material and comprise a contrast enhancement filter.

* * * * *